United States Patent
Neustadt

[15] 3,684,814
[45] Aug. 15, 1972

[54] METHOD AND APPARATUS FOR AMPLIFYING VIBRATIONS PRODUCED FROM MUSICAL INSTRUMENTS

[72] Inventor: Herbert M. Neustadt, Annapolis, Md.

[73] Assignee: Ludwig Industries, Chicago, Ill.

[22] Filed: May 20, 1970

[21] Appl. No.: 38,995

[52] U.S. Cl. ............................... 84/1.04, 84/1.14
[51] Int. Cl. ................................................ G10h 3/02
[58] Field of Search ....... 179/100, 100.41 V; 84/1.01, 84/1.04, 1.14

[56] References Cited

UNITED STATES PATENTS

| | | |
|---|---|---|
| 1,943,873 | 1/1934 | Matthias............179/100.41 V |
| 2,380,514 | 7/1945 | Germeshausen..179/100.41 V |
| 2,435,254 | 2/1948 | Ramberg.......179/100.41 V X |
| 2,760,037 | 8/1956 | Statham.........179/100.41 V X |
| 3,144,522 | 8/1964 | Bernstein...............179/110 B |
| 2,929,885 | 3/1960 | Mueller..................179/110 B |
| 2,866,014 | 12/1958 | Burns.....................179/110 D |
| 3,533,022 | 10/1970 | Engeler et al..........179/110 D |

*Primary Examiner*—Lewis H. Myers
*Assistant Examiner*—Stanley J. Witkowski
*Attorney*—Gradolph, Love, Rogers and Van Sciver

[57] ABSTRACT

An apparatus for amplifying vibrations produced from musical instruments and contemplates a resistive, metal film strain gauge secured to a vibrating part of a musical instrument. For vibraphones, xylophones, and marimbas, each bar is provided with a strain gauge. The strain gauges outputs are combined to drive an amplifier which operates a loudspeaker. The invention also contemplates the use of an electronic squelch circuit.

12 Claims, 10 Drawing Figures

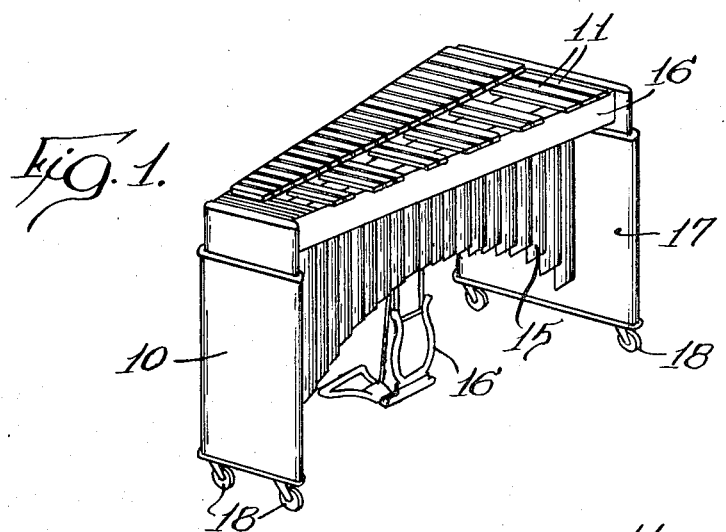
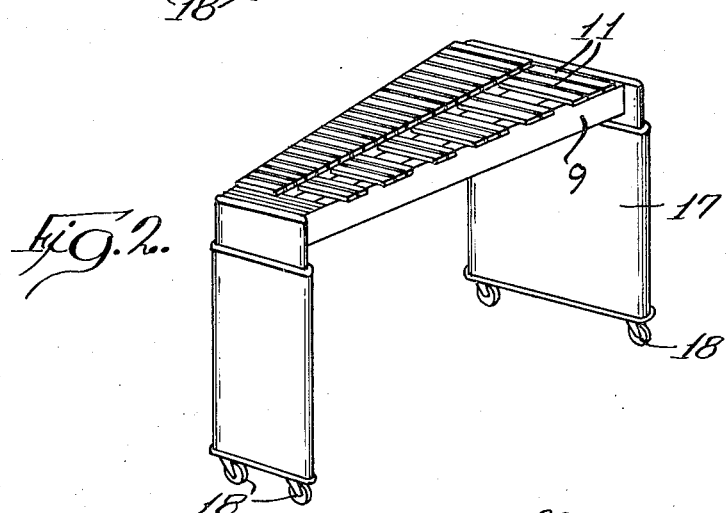
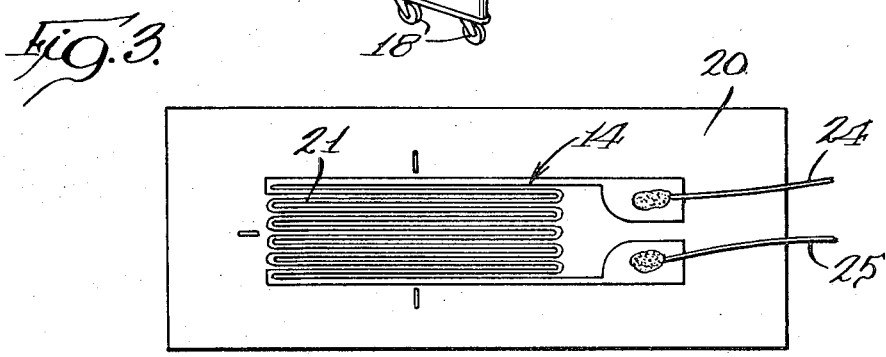

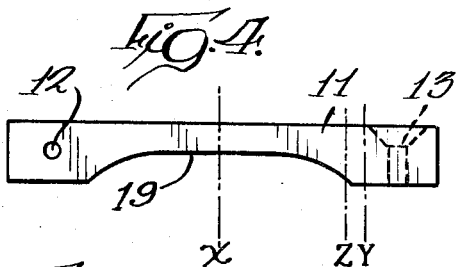
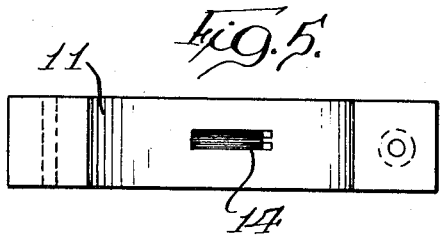
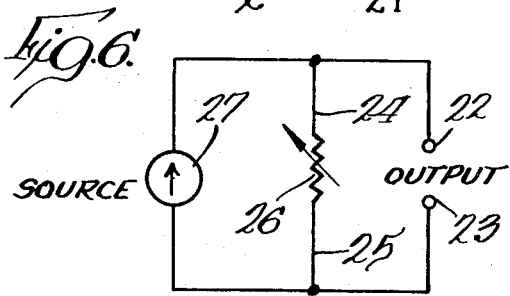
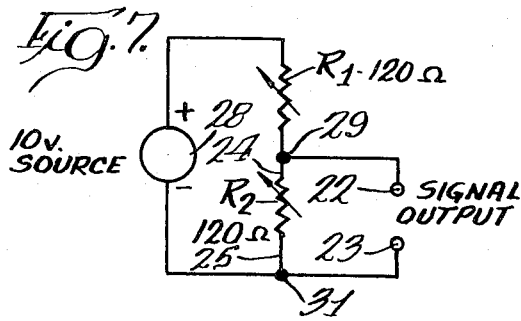
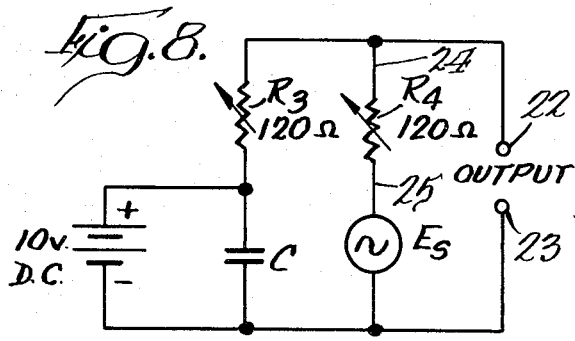
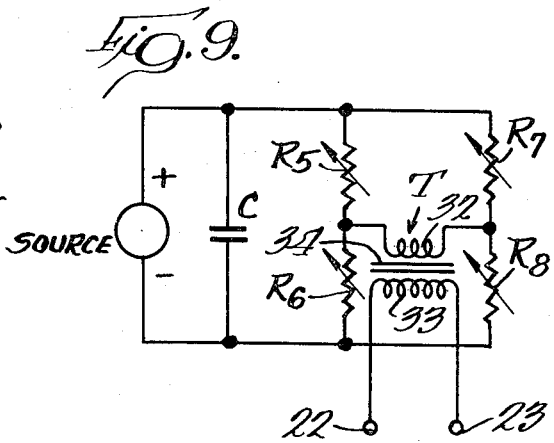
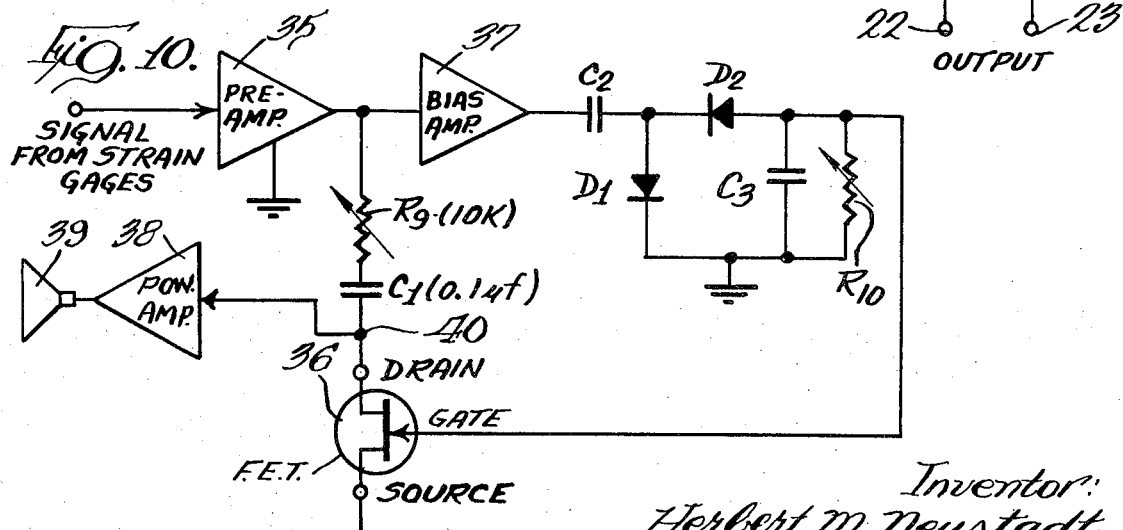

METHOD AND APPARATUS FOR AMPLIFYING VIBRATIONS PRODUCED FROM MUSICAL INSTRUMENTS

BACKGROUND OF THE INVENTION

1. Field of the Invention

The invention relates to the use of a resistive type strain gauge as a transducer for supplying electrical energy to a system for producing sounds. It also relates to an electronic squelch circuit.

2. Description of the Prior Art

In the prior art, various transducers have been employed in connection with musical instruments. In one system, an air-borne sound wave produced by the instrument is sensed by a microphone. Such system is subject to feedback oscillation or "singing" unless carefully designed to prevent acoustical feedback to the microphone from the associated loudspeaker.

In another system, a piezo-electric, variable reluctance, or electrodynamic transducer responds to the mechanical vibrations of a portion of the instrument, such as its sounding board. Such system is not readily subject to oscillation because of the low coupling between the loudspeaker and the instrument, and is readily adapted for use with such musical instruments as guitars. While such transducers are expensive, the cost of the system is not inordinately high, since only one transducer is required. While such transducers are heavy, the musical quality of the instrument is not unduly impaired, since the sounding board has a large mass, a high damping, and a moderately flat frequency response. While such transducers are delicate and easily damaged, they are at least as rugged as the fragile instrument to which they are attached.

SUMMARY OF THE INVENTION

My invention is applicable to musical instruments and is especially useful in connection with vibraphones, xylophones, and marimbas. In such instruments, the number of bars is large; the bars operate independently without appreciable mechanical coupling to a common vibrating member; the bars are precisely tuned members which vibrate at predetermined frequencies with little damping; and the bars are ruggedly constructed since they are subject to the percussive impact of mallets. I have found that only one transducer meets the diverse and divergent requirements for such instruments as vibraphones, xylophones, and marimbas. This transducer is preferably a resistive metal foil or film strain gauge, although a strain gauge formed of wire filaments mounted on a paper or plastic backing may be used. The strain gauge is inexpensive; and each bar may thus be provided with its corresponding transducer at low cost. The strain gauge is light and compliant and does not appreciably change the resonant frequencies of the bars. The strain gauge does not increase the damping of the bars and does not impair the quality of musical output. The strain gauge is rugged and stable, and readily absorbs the impact stresses of the mallets.

A squelch circuit is also disclosed which provides full amplification only when the musical signal is sufficiently strong to mask certain noises, and reduces amplification otherwise.

BRIEF DESCRIPTION OF THE DRAWINGS

FIG. 1 is a perspective view of a standard vibraphone showing resonator tubes and a damping pedal;

FIG. 2 is a perspective view of a vibraphone constructed in accordance with this invention, the damping pedal is not shown;

FIG. 3 is a plan view of a resistive metal foil or film strain gauge which may be secured to the underside of the individual vibraphone bars, and shows the electrical leads therefrom;

FIG. 4 is a side view of a standard vibraphone bar;

FIG. 5 is a bottom view of a standard vibraphone bar with a strain gauge secured thereto;

FIG. 6 shows a circuit wherein all transducers are connected in series across the constant-current source;

FIG. 7 shows a circuit wherein a pair of series-connected transducers are excited by a constant voltage source;

FIG. 8 illustrates that the circuit of FIG. 7 attenuates the signal output by a factor of two;

FIG. 9 shows a circuit wherein four transducers are connected in a bridge configuration providing an output which is insensitive to ripple in the supply voltage; and FIG. 10 shows a squelch circuit which provides full amplification only when the musical signal is sufficiently strong to mask the noise, and reduces amplification otherwise.

DESCRIPTION OF THE PREFERRED EMBODIMENTS

In accordance with this invention, a metal film resistive strain gauge is mounted on a musical instrument, such as on each bar of a vibraphone. When a strain gauge is to be used as a transducer for a musical instrument, such as a vibraphone, two factors should be taken into consideration. The first is whether the strain gauge will provide adequate high-frequency response. The second is whether the strain gauge will provide adequate signal-to-noise ratio.

As to the first factor the requirements are met because the only limitation on the strain gauge's high-frequency response is the capacitance across the gauge. Most of this capacitance exists because the metal resistive film of the strain gauge is bonded to one side of a thin insulating sheet and the other side is cemented to the aluminum alloy vibraphone bar. The capacitance is not more than $500 \times 10^{-12}$ farad; and for a 120 ohm gauge this produces an RC product of $60 \times 10^{-9}$ second corresponding to a corner or cut-off frequency of $16.7 \times 10^6$ radians/second or $2.7 \times 10^6$ Hz, which is far above the audible range.

With respect to the second factor, the signal-to-noise ratio is especially important where a vibraphone or similar musical instrument is played in an auditorium or in conjunction with other loud musical instruments. When the musician strikes a vibraphone bar for a fortissimo note in an auditorium, he desires a signal power on the order of 100 watts delivered to the loud speaker by the power amplifier. He, therefore, will usually operate the amplifier with the volume control at maximum setting. When a musical score calls for silence, there will be no musical sound to mask the noise output from the amplifier. Since musicians and their audiences are critical listeners, the signal-to-noise ratio is critical.

The signal-to-noise ratio obtainable from a resistive strain gauge, for example on a vibraphone bar, may be estimated as follows. The strain gauge considered may be the low-cost 120 ohm metal resistor "Type SR-4." The d-c voltage supplied to the strain gauge is 5 volts so that the d-c power dissipated by the gauge is $(5)^2/120 = 0.21$ watt.

The mean-square thermal noise voltage across the gauge is:

$$e_n^2 = 4\,KTBR \qquad 1.$$

in which K, Boltzmann's constant, is $1.37 \times 10^{-23}$ joule per degree Kelvin; T is the absolute temperature of the gauge which can be assumed to be room temperature 293° K (The 0.21 watt dissipated by the gauge produces negligible temperature rise because the gauge is cemented to an aluminum bar which is a highly effective heat sink.); B is the bandwidth in cycles per second and is to be 10,000; and R is 120 ohms.

Substituting these values, $$e_n^2 = 4 \times 1.37 \times 10^{-23} \times 293 \times 10^4 \times 120 \qquad 2.$$
$$= 1.92 \times 10^{-14}\,\text{volt}^2$$

The r.m.s. noise voltage across the gauge is the square root of this number. Hence $$e_n = 1.38 \times 10^{-7} \cong 0.14\,\text{microvolt} \qquad 3.$$

I have found that a bar-mounted gauge operated at 5 volts d-c gives a signal on the order of two millivolts when the bar is struck moderately hard with a vibraphone mallet. If we consider a mallet stroke of such energy that the signal from the gauge is 1.4 millivolts r.m.s., we can say that the gauge's signal-to-noise ratio is $$\frac{e_s}{e_n} = \frac{1.4 \times 10^{-3}}{0.14 \times 10^{-6}} = 10^4 \qquad (4)$$

a voltage ratio of 80 db.

A signal-to-noise ratio of 60 db is considered good in reproduction of music from disc and tape. Hence, the preceding calculation shows that the strain gauge can provide excellent signal-to-noise ratio in a vibraphone application.

I have measured the signal-to-noise ratio of a working vibraphone amplifier using bar-mounted strain gauges. Since the noise level at the gauge is less than a microvolt, too small to be easily measured, the measurement was made at the preamplifier output where the gauge signal voltage is amplified by approximately 1,000. The total noise voltage at this point includes not only gauge thermal noise but also amplifier noise and hum. It was expected that the signal-to-noise ratio measured at this point would be somewhat less than 80 db.

The preamplifier output r.m.s. noise voltage measured on a Hewlett-Packard 3,400 A voltmeter was less than $10^{-3}$ volt. The r.m.s. signal voltage measured at the same circuit point was 2 volts when a bar was struck with an amount of energy no greater than a musician could be conservatively expected to use in playing. Thus the measured signal-to-noise voltage ratio was greater than 2,000 or 66 db.

With respect to the mechanical installation of gauges, the standard vibraphone has 37 aluminum vibratile bars covering a three-octave pitch range from the F below middle C, $F_3$ in the American Standard Acoustical Terminology, to $F_6$. A side view of a bar 11 having a horizontal mounting hole 12 near one end thereof, and a vertical stepped mounting hole 13 near the other end thereof is shown in FIG. 4. The bottom view of the bar 11 having a centrally mounted resistive strain gauge 14 (such as shown in FIG. 3) is shown in FIG. 5.

A standard prior art vibraphone 10 is shown in FIG. 1 and is provided with the usual bars 11, each of which has an air-column resonator tube 15 attached thereto. A damping pedal 16, which is well known in the art, is also provided. The vibraphone bars 11 are supported by a pair of horizontally extending and converging members 9, only one of which is shown, which are in turn mounted upon a pair of upright pedestals 17 to which casters or rollers 18 are generally attached.

The vibraphone shown in FIG. 2 includes the bars 11 and the converging members 9 which are also mounted on a pair of pedestals 17. However, it is to be noted that no resonator tubes 15 are used in the vibraphone of FIG. 2. The vibraphone of FIG. 2 may be provided with a damping pedal 16 (not shown) as in FIG. 1.

FIG. 3 shows a resistive-type, metal foil or film, strain gauge generally indicated by the numeral 14, which is secured to the underside of the bar 11, preferably adjacent a hollowed portion 19 thereof, which is provided on the underside of the bars 11, the contour thereof being utilized for tuning the respective bars 11 as is well understood in the art. The strain gauge 14 comprises a thin paper or plastic backing or substrate 20 and a zigzag pattern 21 of conductive material connected to output leads 24 and 25. The pattern 21 may be deposited on an insulating substrate 20 which may be secured to bar 11 by an epoxy resin or other adhesive or bonding material.

Each bar 11 is supported by taut strings (not shown) of metal or woven non-metallic material which extend through the horizontal holes 12 in the bars 11. The bars are secured to the body of the vibraphone by means (not shown) which extend through the vertical openings 13 in the bars 11. The means for securing the bars to the vibraphone body is well known in the art.

Because the internal damping of the aluminum bars is very small, the bar if not dampened may continue to sound for ten or more seconds after being struck. During this long sustained tone, it is musically important that the frequency components of the bar's vibration should not beat with each other. In other words, the fundamental component and any loud, sustained overtones should be harmonically related in frequency. Since a bar of uniform width and thickness has inharmonic natural frequencies, it is modern practice to grind the bar so that its thickness varies substantially along the bar's length. A commercially used profile is shown in the views of FIGS. 4 and 5. In practice, the bar is ground so that: (1) the fundamental frequency of the bar is tuned to the correct value; (2) there is only one strong overtone with small damping; and (3) that overtone, in a bar of the low and middle octave, is tuned to precisely four times the fundamental frequency of the bar. (In a bar of the top octave, precise tuning of the overtone is relatively unimportant because the fourth-harmonic frequency is high enough so that the ear is relatively insensitive to it.)

For bars of the profile shown in FIGS. 4 and 5, I find that the optimum mounting location of a strain gauge is different for bars of the top octave than for bars of the lower two octaves. On all bars, I cement a gauge to the lower surface of the bar. (The upper surface is the one struck by the musician.) For the two lower octaves, the best location of the gauge on the bar is approximately at the center as indicated by "X" in FIG. 4. This location is at an antinode of the bar's fundamental-frequency vibration and, therefore, provides maximum signal output from the gauge.

However, for a bar in the top octave, a gauge mounted at the X position gives a musically unsatisfactory signal. If the signal is amplified and fed to a loudspeaker, the sound output from the speaker includes an excessively loud "thump" which occurs just when the striking mallet impinges on the bar. This mallet thump can be reduced by using a mallet head having less mass than the standard mallet head. But some musicians do not like light mallet heads; therefore, some other way must be found for reducing the thump on top-octave bars.

I have found that mallet thump may be reduced by mounting the gauge at a point on the bar where the bar has more mass per unit length (more thickness) than it does at the mid-point X. If the gauge is mounted at point Y in FIG. 4, mallet thump is practically eliminated in the gauge signal. However, the gauge-signal amplitude is also reduced to about one-third of the value for location X. Location Z in FIG. 4 is a good compromise. Here, the mallet thump is reduced to an acceptable level, and the signal amplitude is about one-half that for location X.

When a bar is excited into up-and-down vibration by a mallet blow, the lower surface of the bar is alternately compressed and stretched by the bar's flexing. A strain gauge that is properly cemented to this surface undergoes the same compressing and stretching. Thus the resistance of the gauge varies according to a time function that has the same frequency components as the bar's flexural vibration.

For electronic amplification, this resistance variation must be converted into a corresponding voltage or current variation. There are several ways to accomplish this conversion; one of which is shown in FIG. 6. A constant-current source 27 forces a d-c current (40 ma. is a typical value) through all gauges connected in series; and the varying resistance of each gauge produces a corresponding a-c voltage. This a-c voltage is used as the signal input to an electronic amplifier. Resistance 26 indicates the equivalent resistance of one or more serially connected strain gauges. A signal voltage developed by any of the gauges will appear at the signal output leads 24 and 25 of FIG. 6 and will not be attenuated by the resistance of the other gauges. The internal impedance of the constant-current source 27 should be large compared with the total equivalent resistance 26 of the gauges connected in series.

A well-filtered constant-current (high internal impedance) d-c supply as in FIG. 6 is usually more expensive than an equally filtered constant voltage (low-internal impedance) d-c supply as in FIG. 7. Thus the circuit of FIG. 7 is generally preferable in practice to that of FIG. 6.

It should be noted that, in FIG. 7, half the signal from either gauge is lost by voltage-divider action in the resistance of the other gauge. In FIG. 7 a ten volt d-c source 28 supplies serially-connected 120 ohm strain gauge resistors R1 and R2. Output terminals 22 and 23 are connected across strain gauge R2.

Referring now to FIG. 8, strain gauge resistors R3 and R4 respectively correspond to resistors R1 and R2 of FIG. 7. It is assumed that gauge R4 develops a signal on the order of 1 millivolt, which is represented by an equivalent a-c signal source $E_s$ of zero impedance in series with resistor R4. It is further assumed that gauge R3 generates no signal. The capacitor C provides a very low a-c output impedance for the 10 volt supply. If this supply is to be a constant-voltage source, the impedance of C must be much smaller than 240 ohms for all signal frequencies of interest.

It is clear from FIG. 8 that the signal voltage $E_s$ is attenuated by one-half (6db) at the signal output terminals 22 and 23. At the same time in the signal-frequency range, the resistance between the output terminals 22 and 23 is one-half of 120 ohms (since C is a substantial short circuit in this frequency range). The rms thermal noise voltage between the terminals is, therefore, $1/\sqrt{2}$ times that for 120 ohms. It follows that the signal-to-noise ratio for either gauge in FIGS. 7 and 8 is 3db less than that for a single gauge.

A further improvement over the circuit of FIG. 7 is shown in FIG. 9. This circuit provides a signal output that is insensitive to any 60 Hz or 120 Hz ripple in the d-c voltage supply. If $R5/R6 = R7/R8$, the gauges form a balanced bridge that does not couple to the signal output terminals any ripple voltage from the supply. The bridge output is applied across the primary winding 32 of a transformer T. The impedance of winding 32 should be large compared with 120 ohms. The signal voltage developed by any one of the four gauges $R5$, $R6$, $R7$ and $R8$ is attenuated by one-half at the primary terminals. The secondary of the transformer is shown at 33, and the core at 34. Output terminals 22 and 23 are connected to the secondary 33 of the transformer T. The resistance across the primary terminals is 120 ohms. Consequently, the signal-to-noise ratio for this circuit is 6db less than that for a single gauge. This 6db reduction is but a small price to pay for the ripple insensitivity provided by the bridge circuit of FIG. 9.

In order to produce the 37 tones of a vibraphone, 10 circuits similar to that shown in FIG. 9 are provided. One of the circuits comprises only one transducer and three fixed resistors of 120 ohms each. All ten secondary windings 33 may be connected in series. Thus the transducer outputs may be electrically summed without adverse loading effects.

Since the transducers for the upper octave are preferably mounted off center at position Z in FIG. 4, the turns ratio for the transformers T of the upper octave may be twice that for the transformers of the middle and lower octaves. This compensates for the 50 percent reduction in signal amplitude across the primary windings 32 of the upper octave transformers and equalizes the outputs across secondary windings 33 for all octaves.

While I have shown direct-current excitation for the strain gauges, it will be understood that alternating current excitation may be employed. The carrier frequency should be appreciably greater than the highest musical frequency, and may be provided by a 100 KHz power oscillator (not shown). In such case, one winding of each bridge output transformer should be provided with a shunt tuning capacitor (not shown) affording resonance at the carrier excitation frequency.

A squelch circuit can reduce the effects of noise in the transducers and preamplifier of an amplified instrument such as a vibraphone. The effects of noise are most objectionable when the musician turns the volume control up to maximum setting and does not strike any of the bars. With no musical sound to mask the noise, hiss and hum from the loudspeaker are prominently audible.

A function of the squelch circuit is to reduce automatically the gain of the amplifier when the signal from the transducers is less than some threshold value, and to restore automatically the gain to full value when the signal is greater than the threshold value. With the threshold value set at least slightly above the noise level, the squelch circuit can provide full amplification when the musical signal is strong enough to mask the noise, and reduce amplification otherwise.

FIG. 10 shows a squelch circuit for a vibraphone amplifier using resistive strain gauges as transducers. Pre-amplifier 35 preferably has low noise. The signal input to pre-amplifier 35 is obtained from the serially connected secondary windings 33. If the transformers for the middle and lower octaves have a voltage step-up ratio of 20:1 and the pre-amplifier has a voltage gain of 100, the signal output voltage of the pre-amplifier is 2,000 times the signal voltage at the transformer primary.

The signal output voltage of the pre-amplifier 35 is supplied through a 10,000 ohm resistor R9 in series with a 0.1 uf capacitor C1 to a drain terminal of an N-channel FET 36 (field effect transistor) operated as a voltage-variable resistance. The important characteristic of the FET 36 is that its drain-to-source impedance is 200 ohms when the gate bias voltage is zero, but is many megohms when the gate bias is more negative than −5 volts. It is apparent that the FET 36, together with the 10,000 ohm resistor constitute a controllable voltage divider that is driven by the pre-amplifier 35 and supplies an output signal to a power amplifier 38. When the gate bias voltage (gate-to-source voltage) is zero, the signal voltage supplied to the power amplifier is only about $200/10,000 = 1/50$ of the signal output from pre-amplifier 35. When the gate bias is more negative than −5 volts, practically all of the pre-amplifier signal output is supplied to power amplifier 38.

The gate bias voltage is obtained from a voltage-doubling detector which is driven by a bias amplifier 37. The bias amplifier 37, in turn, is driven by pre-amplifier 35. Since this arrangement makes the gate bias highly negative for large signals and only slightly negative for small signals, the circuit provides excellent squelch action.

For a more detailed explanation, assuming the rectifier circuit is truly a voltage doubler so that a 5 volt gate bias requires a signal from the bias amplifier 37 of 2.5 volts peak, and further, the voltage gain of the bias amplifier 37 is 250, then the full 5 volt negative bias is developed when the signal from the pre-amplifier has a peak amplitude of 0.01 volt or 10 millivolts. That is, 10 millivolts peak is the threshold value for signal output from the pre-amplifier 35. For all signals greater than this threshold, practically all of the pre-amplifier signal output is supplied to the power amplifier. But for a peak noise amplitude of 2 millivolts or one-fifth of the threshold, the control bias on the FET is only −1 volt; the FET resistance is correspondingly small; and only a small fraction of the pre-amplifier signal output is supplied to power amplifier 38 through a terminal 40. Hence in the absence of a signal, noise is greatly attenuated by the FET voltage divider. But when the musician strikes a bar of a vibraphone hard enough so that the musical signal is more than five times the noise level, there is no attenuation in the FET voltage divider; and the amplifier chain provides full gain. In the sound output from the loudspeaker 39 which is driven by power amplifier 38, the masking effect of the relatively strong musical signal makes the noise almost imperceptible to the ear.

One of the requirements for a vibraphone squelch circuit is as follows. If a musician strikes a fortissimo note on one of the vibraphone bars after a period of silence, the audience should hear the first few cycles of the resultant musical sound at full amplified volume, the control bias on the FET gate should change from zero to −5 volts in a time that is comparable to the fundamental period of the musical tone. In other words, the time constant for charging of capacitor C3 shown in FIG. 10 by the bias amplifier output from bias amplifier 37 should be on the order of 0.1 millisecond or less. It is convenient to denote this time constant by $R_oC_3$, in which $R_o$ is a function of the bias amplifier's output resistance and the forward resistance of diodes D1 and D2.

For an explanation of a second dynamic requirement, if the musician strikes several notes forming a chord and then permits the sound of the chord to die away, then since the vibraphone employs an even-tempered scale, the various tones in the chord will beat together. Because of these beats, the peak-to-peak amplitude of the composite musical signal will fluctuate at frequencies in the range between approximately 1 cycle per second and 10 cycles per second. This amplitude fluctuation is superposed on the exponential decay of signal amplitude which is due to the internal damping of the vibratile bars and which has a time constant on the order of 10 seconds.

As the fluctuating musical signal dies away exponentially, there will come a time when the signal output of the pre-amplifier 35 is fluctuating at beat frequency above and below the threshold value of signal amplitude. If the control bias across capacitor C3 were to fluctuate at this same beat frequency, the signal attenuation of the FET voltage divider would fluctuate at beat frequency and the speaker output would include a "huh-huh-huh" sound that is musically undesirable.

Thus, the control bias voltage, which must go from zero to −5 volts very quickly when the bars are struck, must thereafter decay only slowly. These two requirements can be satisfied by making the control bias voltage have a fast rise time from zero to −5 volts, and a slow decay time from −5 volts to zero. The fast rise time is provided, as previously stated, by making the time constant $R_oC_2$ not more than 0.1 millisecond. The slow decay time can be provided by making the time constant $R_{10}C_3$ not less than 1 second.

The third dynamic requirement for the instrument requires an upper limit on the decay time constant $R_{10}C_3$. If this time constant were made as long as 1 minute, for example, the audio gain would stay at a full value for a few minutes after the musical signal had died away to zero amplitude, and during these few minutes the background noise voltage would receive full amplification. It follows that, while the time constant $R_{10}C_3$ should be larger than 1 second, it should not exceed approximately 10 seconds. I have found a value of 3 seconds to be satisfactory in practice.

RC values that satisfy the three dynamic requirements, and that are easy to realize in practice are as follows:

$R_6$=100 ohms   $C_2$=10 uf
$R_{10}$=3 megohms   $C_3$=1 uf

Where the strain gauges are afforded 100 KHz carrier frequency excitation, pre-amplifier 35 should be tuned to such frequency and may drive a phase-sensitive detector, which receives a reference input from the carrier oscillator. The output from such phase-sensitive detector may drive an emitter follower, the output of which in turn drives both R9 and the bias amplifier 37.

It is obvious that my invention may be applied to other instruments than vibraphones, for example, to other mallet percussion instruments such as the xylophone and the marimba.

Since the xylophone and marimba use wooden rather than aluminum bars, application of the invention to these instruments differs in a few details from the vibraphone application described above. These details are briefly discussed in the following.

With reference to the thermal-noise discussion accompanying Equation 1, a wooden bar is not as good a heat sink as an aluminum bar, and a strain gauge mounted on a wooden bar operates at a higher temperature than the one on an aluminum bar. Nevertheless, experience with strain gauges on marimba bars has shown that the temperature difference does not seriously reduce signal-to-noise ratio.

With reference to mechanical mounting, experience has shown that the gauge position on a typical marimba wooden bar may be the same as that for a typical vibraphone aluminum bar of the same pitch.

With reference to electrical installation, the circuit shown in FIG. 9 is suitable for use with wooden bars as well as well as aluminum bars.

With reference to the squelch circuit of FIG. 10, the decay time constant $R_{10}C_3$ may be made shorter for use with wooden bars than for aluminum bars. The reason is that the vibration of a wooden bar decays so rapidly that the beats in a tempered chord are relatively unimportant.

B similar minor modifications, the invention may be applied to bars of steel, plastic and other materials suitable for vibratile bars and to other instruments having a plurality of vibratile members.

I claim:

1. In a musical instrument having a number of independently vibrating members, the combination including a corresponding number of metal resistive strain gauges secured to the respective members, means for passing exciting current through each strain gauge to produce a voltage thereacross, means for electrically summing the strain gauge voltages to produce a resultant voltage, an alternating current amplifier, a loudspeaker, means responsive to the resultant voltage for driving the amplifier, and means coupling the amplifier to the loudspeaker.

2. A musical instrument as in claim 1 wherein the exciting means comprises a high impedance source and wherein the summing means comprises means for connecting all strain gauges in series across the source.

3. A musical instrument as in claim 1 wherein the exciting means comprises a low impedance source and wherein the summing means comprises means for serially connecting two strain gauges across the source.

4. A musical instrument as in claim 1 wherein the exciting means comprises a low impedance source and wherein the summing means comprises means for connecting the strain gauges in a balanced bridge circuit.

5. A musical instrument as in claim 1 wherein the number of strain gauges is more than four; wherein the exciting means comprises a low impedance source; and wherein the summing means comprises means for connecting the strain gauges in a plurality of balanced bridge circuits each providing an output, a corresponding plurality of transformers each having a primary and a secondary winding, means coupling the output of each bridge circuit to a corresponding primary winding, and means connecting all secondary windings in series.

6. A musical instrument as in claim 1 wherein one vibrating member is a tuned bar simply supported adjacent its ends and adapted to sustain up-and-down flexural vibration when its upper surface is struck with a mallet and wherein one strain gauge is secured to the under surface of the bar.

7. An instrument as in claim 6 wherein said strain gauge is secured to the bar intermediate its supports.

8. An instrument as in claim 6 wherein said strain gauge is secured to the bar closer to one support than to the other support.

9. In a musical instrument having a vibrating member, the combination including a metal resistive strain gauge secured to the member, means for passing exciting current through the strain gauge to produce a voltage thereacross, an alternating current amplifier, a loud speaker, means responsive to the voltage across the strain gauge for driving the amplifier, means coupling the amplifier to the loud speaker, said exciting means comprising a low impedance source and means including three resistors for coupling the source to the strain gauge in a balanced bridge circuit.

10. In a musical instrument having a vibrating member, the combination including a metal resistive strain gauge secured to the member, means for passing exciting current through the strain gauge to produce a voltage thereacross, an alternating current amplifier, a loud speaker, means responsive to the voltage across the strain gauge for driving the amplifier and means coupling the amplifier to the loud speaker, said means coupling the amplifier to the loud speaker comprising a controllable voltage divider.

11. An instrument as in claim 10 wherein the voltage divider comprises a field-effect transistor having a gate, a combination further including an amplitude detector, means coupling the amplifier to the detector, and means coupling the detector to the gate.

12. In a musical instrument comprising a plurality of bars which are to be struck to produce various tones which may yield beat frequencies in the range between one and ten cycles per second and in which the beat frequency amplitude fluctuation is superposed on an exponential decay of tone amplitudes due to internal damping of the bars and having a time constant on the order of 10 seconds, a preamplifier, means for electrically transmitting signals from said bars to the preamplifier, the signal output of the preamplifier fluctuating at said beat frequency above and below the threshold value of the signal amplitude, a capacitor electrically connected to the preamplifier means providing a control bias across said capacitor which rapidly changes from a first potential to a second potential when a bar is struck and which thereafter changes slowly from the second potential to the first potential, the time constant of said rapid change being not more than approximately 0.1 millisecond, and the time constant of the slow change being not less than approximately 0.1 seconds.

* * * * *